(12) United States Patent
Lawrence (10) Patent No.: US 9,456,596 B2
(45) Date of Patent: Oct. 4, 2016

(54) FISH TOOL

(71) Applicant: Keith Alan Lawrence, Ponca City, OK (US)

(72) Inventor: Keith Alan Lawrence, Ponca City, OK (US)

(73) Assignee: Out Tool LLC, Ponca City, OK (US)

( * ) Notice: Subject to any disclaimer, the term of this patent is extended or adjusted under 35 U.S.C. 154(b) by 237 days.

(21) Appl. No.: 14/159,857

(22) Filed: Jan. 21, 2014

(65) Prior Publication Data

US 2014/0202064 A1 Jul. 24, 2014

Related U.S. Application Data

(60) Provisional application No. 61/755,802, filed on Jan. 23, 2013.

(51) Int. Cl.
*A01K 97/00* (2006.01)
*A01K 97/18* (2006.01)

(52) U.S. Cl.
CPC ..................... *A01K 97/18* (2013.01)

(58) Field of Classification Search
USPC ................................. 43/53.5, 54.1
See application file for complete search history.

(56) References Cited

U.S. PATENT DOCUMENTS

| | | | | |
|---|---|---|---|---|
| 1,025,362 A | * | 5/1912 | Beyou ................... | A61B 17/30 294/99.2 |
| 1,879,161 A | * | 9/1932 | Frambach ............ | A01K 97/18 294/93 |
| 2,867,937 A | * | 1/1959 | Little ................... | A01K 97/18 43/53.5 |
| 3,405,963 A | * | 10/1968 | Neely ................... | A22C 25/025 294/118 |
| 3,521,396 A | * | 7/1970 | Allen .................... | A01K 97/18 43/53.5 |
| 3,707,800 A | * | 1/1973 | Wolfe ................... | A01K 97/18 43/53.5 |
| 4,023,303 A | * | 5/1977 | Maunu ................. | A01K 97/18 43/53.5 |
| 5,092,074 A | * | 3/1992 | Zincke ................. | A01K 97/00 43/53.5 |
| 5,862,552 A | * | 1/1999 | Koelewyn ............ | A01K 97/00 7/132 |

\* cited by examiner

*Primary Examiner* — Christopher P Ellis
(74) *Attorney, Agent, or Firm* — Martin S. High, P.C.

(57) ABSTRACT

The embodiments of the Fishing Tool are comprised of a front and rear element secured together at a common pivot point. Each element is comprised of a handle and an arm. In the embodiments each arm is comprised of a tip end that is formed at an angle from the arm and extends outward from the arm. The Fishing Tool is comprised of a radial handle located on each element so that when the handles are squeezed together each element moves oppositely around the common pivot point causing the radial arms and the tips to move apart in opposite arc paths. An integral ratchet, friction, or other mechanism will cause the device to hold or lock its position until the mechanism is released. An internal spring will assist returning the device to its original, neutral position. The embodiments of the Fishing Tool offer fishermen hands-free assistance with fishhook retrieval/removal.

8 Claims, 7 Drawing Sheets

FISH TOOL

CROSS-REFERENCE TO RELATED APPLICATIONS

This application is a non-provisional patent application of U.S. provisional patent application with Ser. No. 61/755,802 titled "Fish Tool" filed on Jan. 23, 2013. This application claims priority of U.S. provisional patent application with Ser. No. 61/755,802, and the entire contents of U.S. provisional patent application with Ser. No. 61/755,802 is herein incorporated by reference.

STATEMENT REGARDING FEDERALLY SPONSORED RESEARCH OR DEVELOPMENT

Not applicable

FIELD OF THE EMBODIMENTS

The field of the embodiments of the Fish Tool is fishing. More specifically, but without limiting the scope of the application of the invention, the field of the embodiments includes tools that allow for the removal of hooks from fish.

BACKGROUND OF THE EMBODIMENTS

The background of the embodiments is the broad use of tools for fishing. A common challenge that anglers face after landing a fish is hook removal especially if the fish has deeply swallowed the lure or bait. Most fishermen will hold the fish in one hand while using the other hand to retrieve/remove the hook. Hook removal tools range from the angler's fingers to various types of pliers, forceps, and other specialized devices.

The process seems straight forward enough except for the vigorous opposition to this entire enterprise by the struggling fish. Many anglers have been injured or bitten especially by some of the toothier species of game fish like northern pike, muskie, walleye, sauger, bluefish, barracuda, mackerel, wahoo, etc.

SUMMARY OF THE EMBODIMENTS

Embodiments of the Fishing Tool are comprised of two elements, a front element and a rear element, secured together at a common pivot point. Each element is comprised of a handle and an arm. In the embodiments each arm is comprised of a tip end that is formed at an angle from the arm and extends outward from the arm. In another embodiment, each arm is comprised of a tip end that is approximately ¼ inch to ¾ inch long that points between approximately 60 and 120 degrees from the arm.

Embodiments of the Fishing Tool are comprised of a pawl trigger and a ratchet bar located on each element so that when the handles are squeezed together each element moves oppositely around the common pivot point causing the radial arms and the tips to move apart in opposite arc paths. An integral ratchet, friction, or other mechanism will cause the device to hold or lock its position until the mechanism is released. An internal, external or integrated spring will assist returning the device to its original, neutral position. The embodiments of the Fishing Tool offer fishermen hands-free assistance with fishhook retrieval/removal.

In this respect, it is to be understood that the embodiments in this application are not limited to the details of construction and to the arrangements of the components set forth in the description or illustrated in the drawings. The embodiments are capable of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the embodiments described in this application. Additional benefits and advantages of the present embodiments will become apparent in those skilled in the art to which the embodiments relate from the description of the preferred embodiment and the appended claims, taken in conjunction with the accompanying drawings. It is important, therefore, that the claims be regarded as including such equivalent constructions insofar as they do not depart from the spirit and scope of the embodiments described herein.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application, which is measured by the claims, nor is it intended to be limiting as to the scope of the embodiments in any way.

DETAILED DESCRIPTION OF THE PREFERRED EMBODIMENTS

Figure 1:
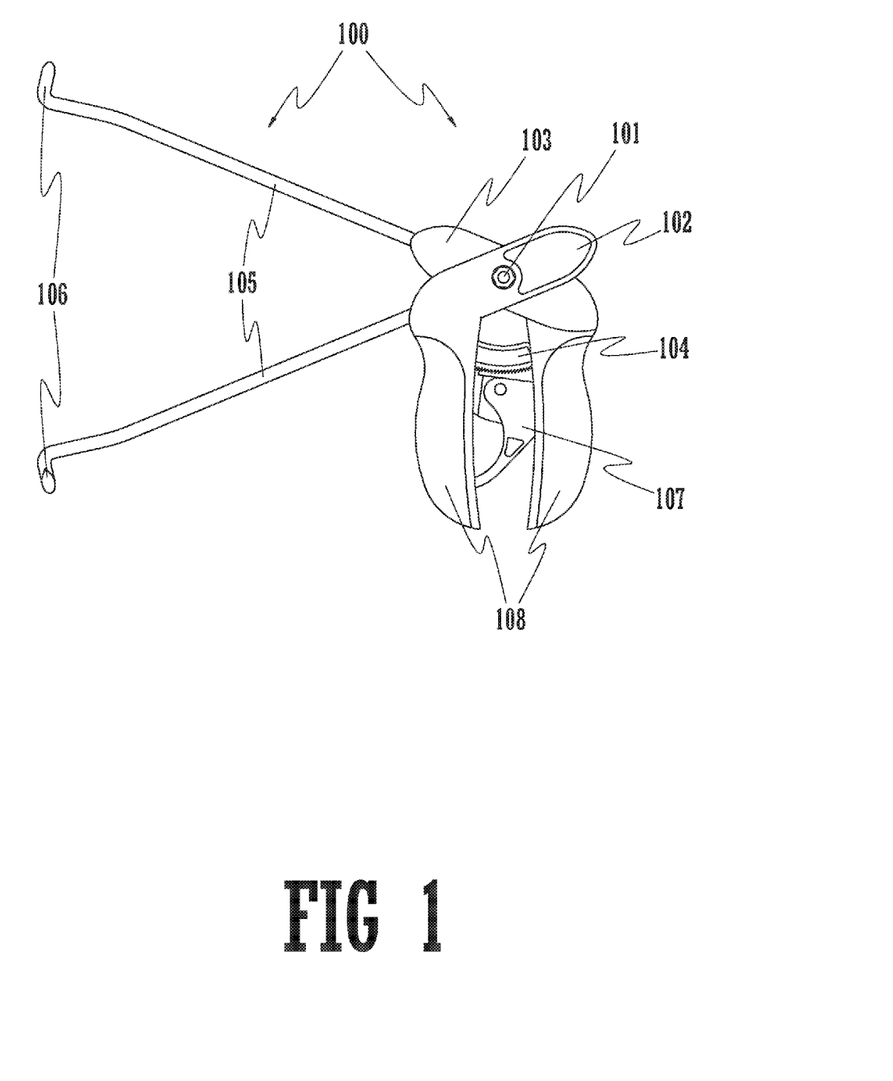
FIG. 1 is a front view of an embodiment of the Fishing Tool.
Figure 2:
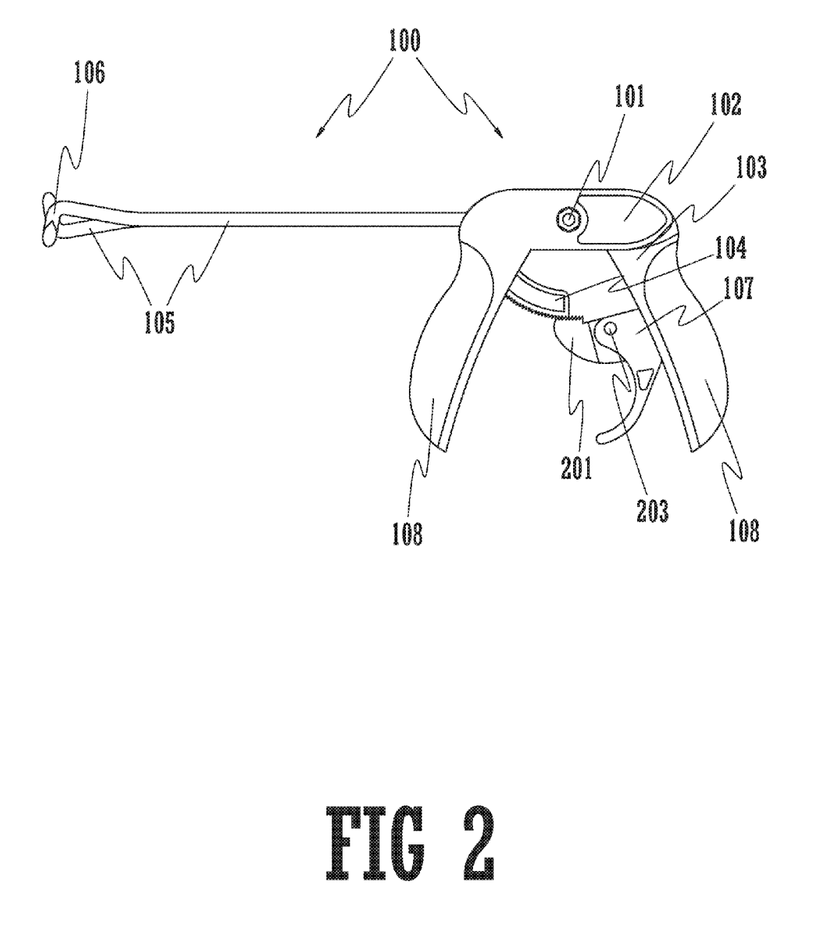
FIG. 2 is a front view of an embodiment of the Fishing Tool.
Figure 3:
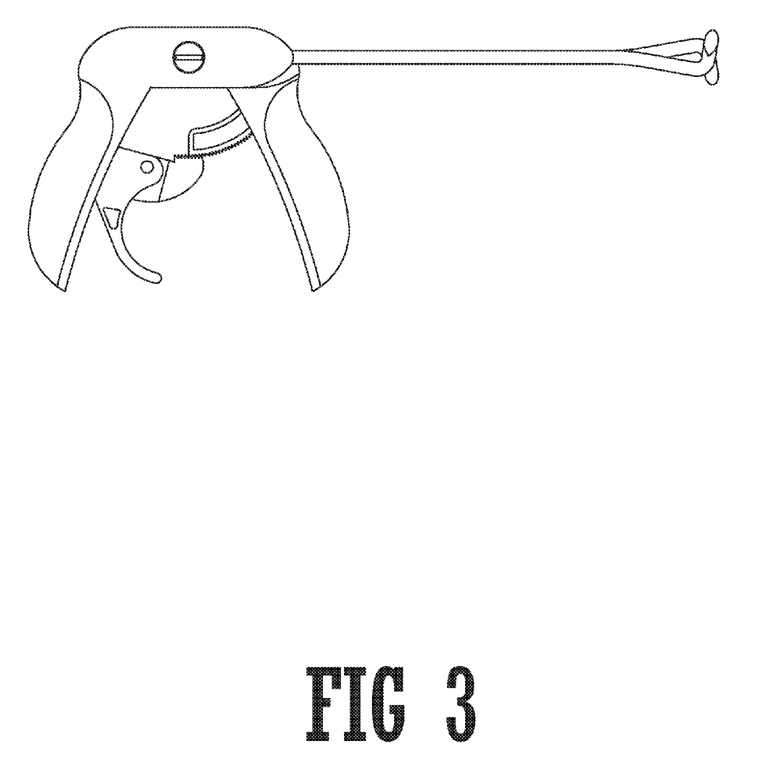
FIG. 3 is a back view of an embodiment of the Fishing Tool.
Figure 4:
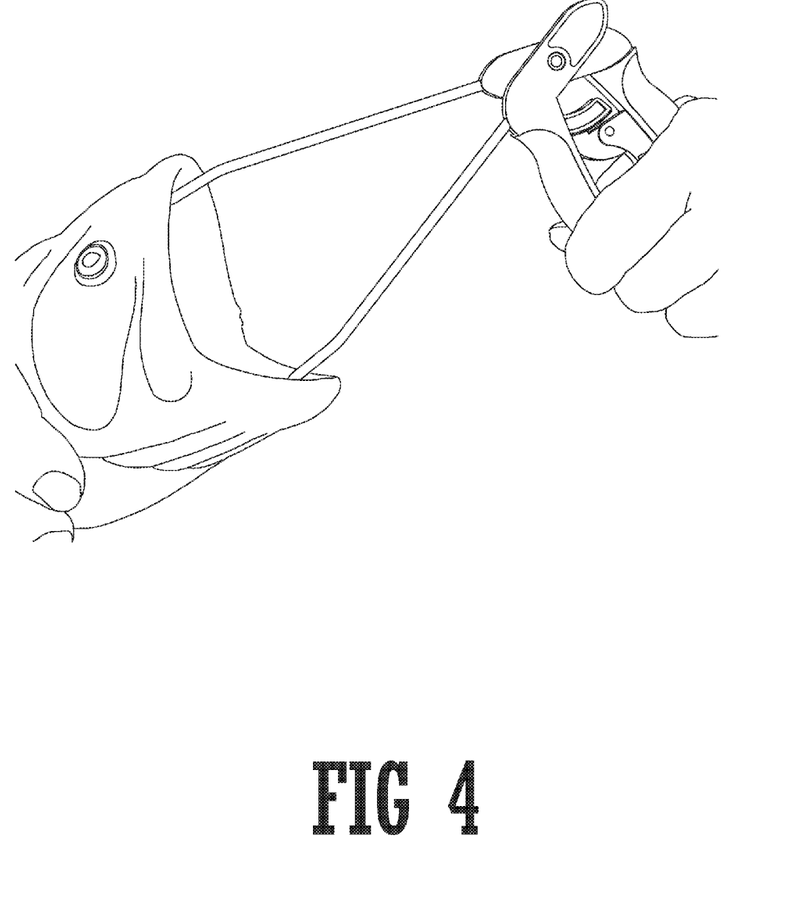
FIG. 4 is a perspective view of an embodiment of the Fishing Tool shown in use.
Figure 5:
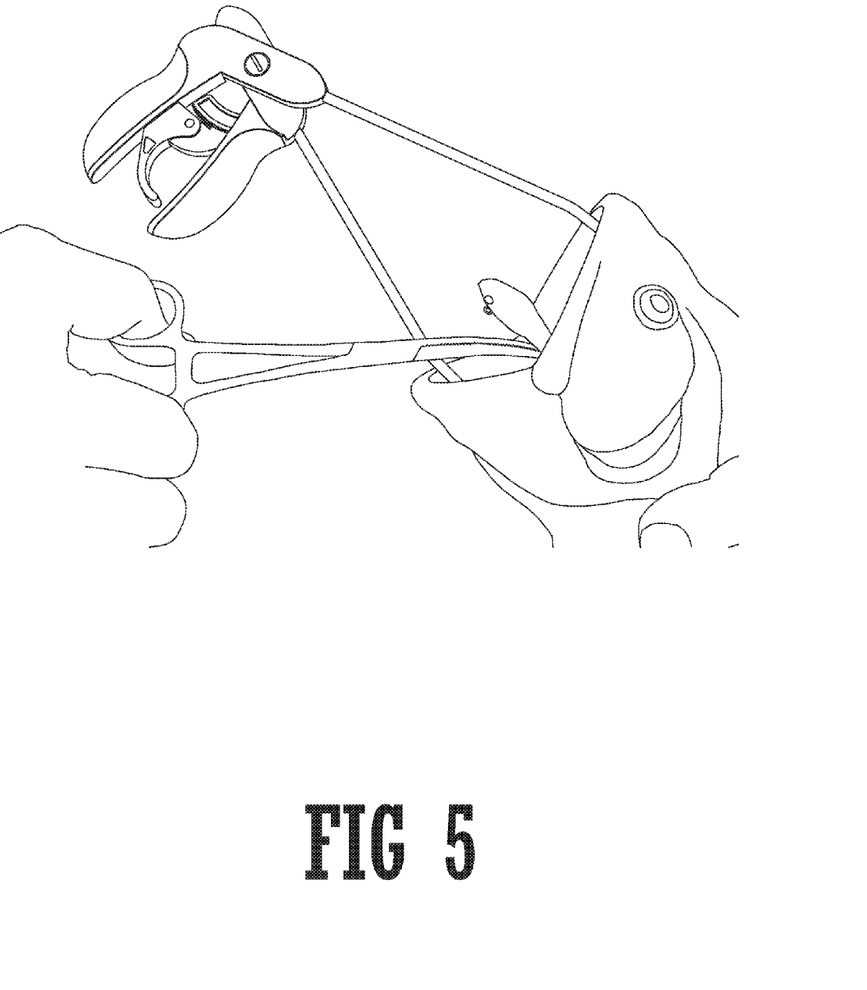
FIG. 5 is a perspective view of an embodiment of the Fishing Tool shown in use.

Embodiments of the Fishing Tool 100 are comprised of two elements, a front element 102 and a rear element 103, secured together at a common pivot point 101. Each element is comprised of a handle 108 and an arm 105. In the embodiments each arm 105 is comprised of a tip 106 end that is formed at an angle from the arm 105 and extends outward from the arm 105. In another embodiment, each arm 105 is comprised of a tip 106 end that is approximately ¼ inch to ¾ inch long that points between approximately 60 and 120 degrees from the arm.

Embodiments of the Fishing Tool 100 are comprised of a pawl trigger 107 located on rear element 103 and a ratchet bar 104 located on front element 102 so that when the handles are squeezed together each element moves oppositely around the common pivot point causing the radial arms and the tips to move apart in opposite arc paths. An integral ratchet bar 104, friction, or other mechanism will cause the device to hold or lock its position until the mechanism is released. An internal, external or integrated spring will assist returning the device to its original, neutral position. The embodiments of the Fishing Tool offer fishermen hands-free assistance with fishhook retrieval/removal.

The pawl trigger 107 is a trigger actuated device that connects to a pawl 201 via a pivot linkage 203. The back of the pawl trigger 107 is also attached at a pivot point inside the handle of the rear element 103. The teeth on the pawl 201 engage with the teeth on the ratchet bar 104. The pawl 201 is attached to the pawl trigger 107 via a pivot linkage 203. The teeth on the pawl 201 engage with the teeth on the ratchet bar 104 so as to temporarily fix the position of the arms 105. The pivot linkage 203 provides a certain amount of play to lessen the force required to release and engage the pawl 201 with the ratchet bar 104. In another embodiment, the pawl 201 and pawl trigger 107 are manufactured from a single piece without a pivot linkage 203.

The Fish Tool provides fishermen the ability to quickly engage a fish's mouth before moving on to the process of hook removal. Simple disengagement is equally desirable so the fish can be saved or released back into the water. Full engagement and release operation of the Fish Tool is one-handed so the fisherman never has to loosen his grip on his catch during the entire hook removal process.

Figure 6:
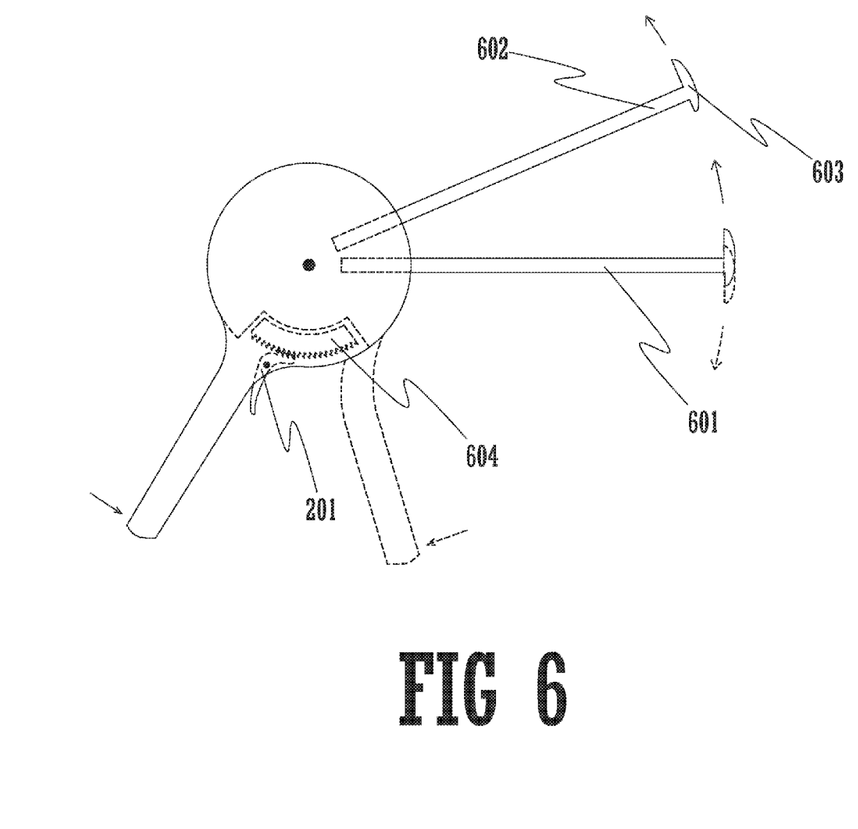
FIG. 6 is a front view of another embodiment of the Fishing Tool with the arms fixed to the elements.

In another embodiment, the radial arms are removable and adjustable to account for fish with a wider jaw distance. In FIG. 6, the first radial arm 601 can be positioned for a small fish orientation or a second radial arm 602 for a large fish orientation. In FIG. 6, there is an arm that is positioned directly behind first radial arm 601 and hidden by first radial arm 601. When the device is actuated by squeezing the handles, first radial arm 601 will travel rotatably and the hidden arm will travel rotatably in the opposite direction. The two arms are attached to the two elements, one to the front element and one to the rear element. As the two arms travel in opposite directions, the arms will open the mouth of the fish. In another embodiment, the arms can also be adjustable in length or telescopic to provide a greater range of spread. In another embodiment a circular ratchet 604 is used to engage with the pawl 201. This arrangement allows for a large range of motion of the arms relative to each other.

The embodiments of the Fishing Tool operate to open the fish's mouth by spreading the fish's jaws apart from the inside of the fish's mouth. In contrast, other methods of opening the fish's mouth include to gripping, securing, or clamping the fish's mouth. Spreading the fish's mouth from the inside as performed in the embodiments is preferable as the fish is less prone to injury and is more convenient for the user.

Figure 7:
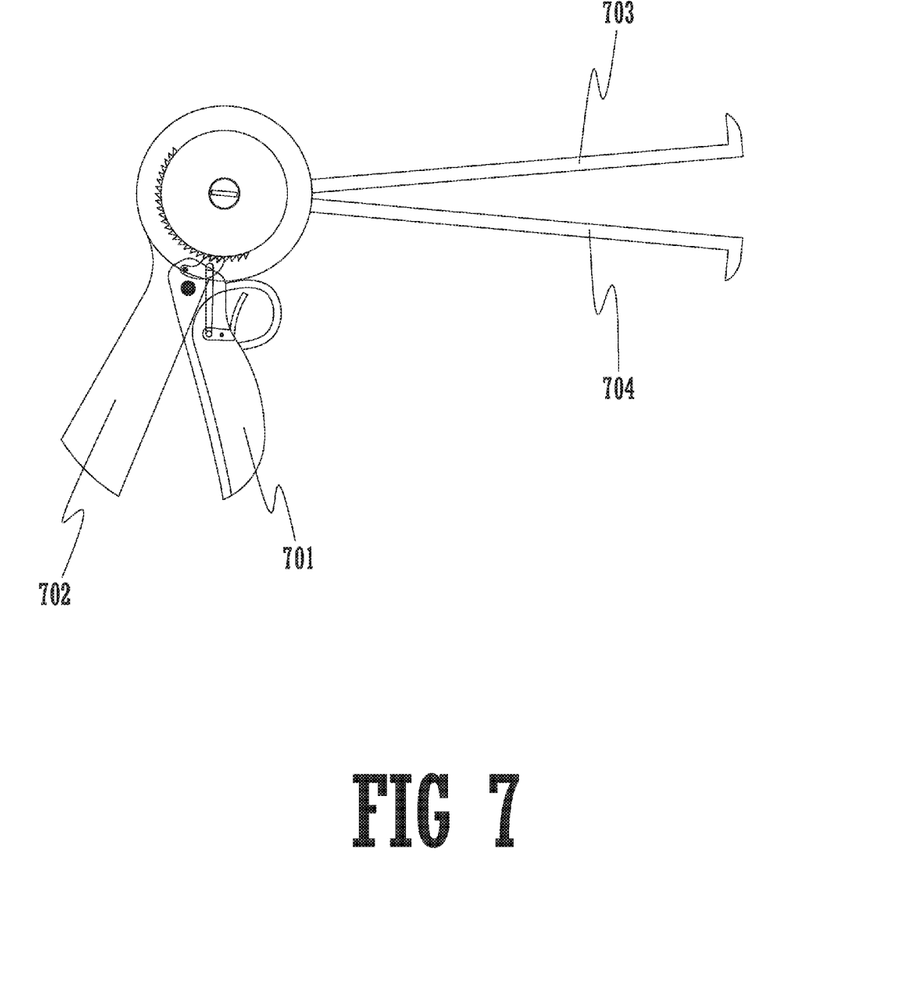
FIG. 7 is a front view of yet another embodiment of the Fishing Tool.

In another embodiment, as shown in FIG. 7, the forward handle 701 can be repeatedly pumped or squeezed relative to the rear handle 702 thereby engaging an advancement means to open arm 703 relative to arm 704. Each repetition of the motion of the handle 701 will advance the rotation of the arm 703 attached to the element engaged to the handle 701. In this way the circular range of arm 703 relative to arm 704 is increased.

In another embodiment, the first radial arm 601 or second radial arm 602 form a spur 603 at the distal ends of the first radial arm 601 or second radial arm 602. The spurs 603 are used to gain purchase and/or leverage for any hook removal tool such as pliers, hemostats or clamps, and can be included in any embodiment.

Other embodiments of the Fishing Tool 100 comprise a light to shine into fish's mouth. This light is useful to see inside the fish's mouth to aid the fisherman to retrieve the lure or hook in the fish's mouth.

Other embodiments of the Fishing Tool 100 comprise padded handles. These padded handles add comfort to the Fishing Tool 100. In addition, in another embodiment the handles can be manufactured from buoyant material and serve as a flotation means in the event the Fishing Tool 100 is dropped in water.

Other embodiments of the Fishing Tool 100 comprise a built-in tether, either retractable or non-retractable, and a tether attachment ring. The tether allows the Fishing Tool to be securely attached to the fisherman's vest or other clothing article and to be readily available to the fisherman. The retractable tether allows the fisherman to simply release the Fishing Tool after the tool has been used and the Fishing Tool will retract to its normal ready position on the fisherman's person.

Other embodiments of the Fishing Tool 100 comprise adjustable, moveable, repositionable or articulating arms. These types of adjustable arms allows the fisherman to adjust the size of the Fishing Tool 100 to match the size of the fish without having to purchase several sizes of tools. The adjustable Fishing Tool 100 will accommodate a wide variety of fish sizes and shapes.

Other embodiments of the Fishing Tool 100 comprise finger loops on handles such as those commonly found on scissors to enhance the comfort of the user; a built-in line cutter; and a notch or spur 603 at end of arm for leverage.

I claim:

1. A fishing tool comprised of
a pivot point;
two elements secured together at the pivot point;
the two elements are each comprised of a handle and an arm wherein each element moves oppositely around the pivot point causing the radial arms and the tips to move apart in opposite arc paths;
each radial arm forms a spur opposite the tip end in order to gain leverage with a hook removal tool;
each arm is comprised of a tip end that points 90 degrees to the arm wherein the arms are used by inserting the arms into the fish's mouth expands the fishes mouth from the inside of the fish's mouth and expands and holds open the fish's mouth
an integral ratchet or friction mechanism that causes the device to hold or lock its position until the mechanism is released; and
an internal, external or integral spring will assist returning the device to its original, neutral position.

2. The fishing tool described in claim 1 wherein each arm is comprised of a tip end that is approximately ¼ inch to ¾ inch long.

3. The fishing tool described in claim 2 wherein each arm points between approximately 60 and 120 degrees from the arm.

4. The fishing tool described in claim 3 comprising a pawl trigger located on a rear element and a ratchet bar located on a front element so that when the handles are squeezed together each element moves oppositely around the common pivot point causing the radial arms and the tips to move apart in opposite arc paths wherein the forward handle can be repeatedly pumped or squeezed relative to the rear handle thereby engaging an advancement means to open radial arm relative to radial arm.

5. The fishing tool described in claim 4 comprising an integral ratchet bar or friction mechanism that will cause the device to hold or lock its position until the mechanism is released.

6. The fishing tool described in claim 5 comprising an internal, external or integrated spring that assists the return of the arms and handles to its original, neutral position.

7. The fishing tool described in claim 6 wherein
the pawl trigger is a trigger actuated device that connects to a pawl via a pivot linkage;
the back of the pawl trigger is attached at a pivot point inside the handle of the rear element;
the teeth on the pawl engage with the teeth on the ratchet bar;
the pawl is attached to the pawl trigger via a pivot linkage;
the teeth on the pawl engage with the teeth on the ratchet bar so as to temporarily fix the position of the arms; and
the pivot linkage provides play to lessen the force required to release and engage the pawl with the ratchet bar.

8. The fishing tool described in claim 7 wherein the pawl and pawl trigger are manufactured from a single piece without a pivot linkage.

* * * * *